United States Patent
Shankar et al.

(10) Patent No.: US 7,478,279 B2
(45) Date of Patent: Jan. 13, 2009

(54) SYSTEM AND METHOD FOR DEBUGGING AN APPLICATION

(75) Inventors: Jagannathan Shiva Shankar, Vijayanagar (IN); Ottalingam Satyanarayanan, Fremont, CA (US); Boris Degtyar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 553 days.

(21) Appl. No.: 11/167,000

(22) Filed: Jun. 23, 2005

(65) Prior Publication Data

US 2006/0294423 A1    Dec. 28, 2006

(51) Int. Cl.
*G06F 11/00* (2006.01)
(52) U.S. Cl. .......................................... 714/20; 714/38

(58) Field of Classification Search ................... 714/20, 714/38
See application file for complete search history.

(56) References Cited

U.S. PATENT DOCUMENTS

| 6,119,173 A * | 9/2000 | Pullen et al. ................. 719/328 |
| 6,279,124 B1 * | 8/2001 | Brouwer et al. ............... 714/38 |
| 6,901,581 B1 | 5/2005 | Schneider |

* cited by examiner

*Primary Examiner*—Robert Beausoliel
*Assistant Examiner*—Charles Ehne
(74) *Attorney, Agent, or Firm*—Trellis IP Law Group, PC

(57) ABSTRACT

A method and apparatus is provided for debugging an application in case of an exception. A cyclic buffer is allocated to the application. Log messages are stored in the cyclic buffer and can be later used to debug the application in case of an exception.

20 Claims, 2 Drawing Sheets

SYSTEM AND METHOD FOR DEBUGGING AN APPLICATION

BACKGROUND OF THE INVENTION

1. Field of Invention

Embodiments of the invention relate in general to application software. More specifically, the embodiments of the invention relate to methods and systems for debugging application software in the case of an exception.

2. Description of the Background Art

Logging is an essential tool in the software development process. It keeps track of the steps performed and logs messages that indicate the condition of the software. The messages may be logged during the execution and/or the debugging of the software. These messages are generally stored on an external memory since the memory resources available on the processor are typically limited.

Every log message has an associated log level. A logging level indicates the extent of message detail to be logged. At a particular logging level, all the messages for that level, as well as for higher levels, are logged. A large volume of low priority messages is logged at a lower logging level. This increases the size of the log, causing the performance of the system to be affected. It is also difficult to analyze such a large-sized log and identify the cause of the possible problem. On the other hand, the low volume of high priority messages are logged and messages of lower severity are discarded at a higher logging level. This leaves the user with a limited amount of information.

In conventional techniques, by default, only errors/exception are logged to avoid the formation of large log files and performance hits. However, this results in insufficient information in the log. As a result, in the case of an exception, the user loses track of the sequence of steps that resulted in the exception, except for the most recent step. This may have limited use in debugging the software, which may result in situations where the user has to be asked to recreate the scenario with logging enabled on certain processes. This may entail multiple iterations in scenarios where multiple processes may be involved in processing a task.

Some software applications also dump system state information from the operating system, with all the registers, in the case of an exception. However, this does not help the application software to comprehend the problems.

To summarize, the errors/exceptions that occur during the course of the operation, over weeks, may not be solved effectively by using conventional techniques. Specifically, if the logging at the lowest levels (debug) is enabled, the performance of the system is affected since the log is of a huge size. Recent customer surveys have shown that customers are not happy to modify the software every time an exception is encountered, and then revert to logging changes to return to normal.

DETAILED DESCRIPTION OF EMBODIMENTS OF THE INVENTION

Various embodiments of the invention provide a method, a system, an apparatus and a machine-readable medium for debugging an application in the case of an exception. The exception includes any error, flaw, mistake, failure, or fault in the application that prevents it from working in an error-free manner or produces an incorrect result. Examples of the exception include transient problems such as a system crash. In various embodiments of the invention, the application can include one or more software modules. In an embodiment of the invention, the application can also include dependencies. A cyclic buffer is allocated to the application depending upon its type. Log messages are stored in the cyclic buffer. These stored log messages can be later used to debug the application in the case of an exception. The various embodiments of the invention may be used by real time as well as non-real time systems.

Figure 1:
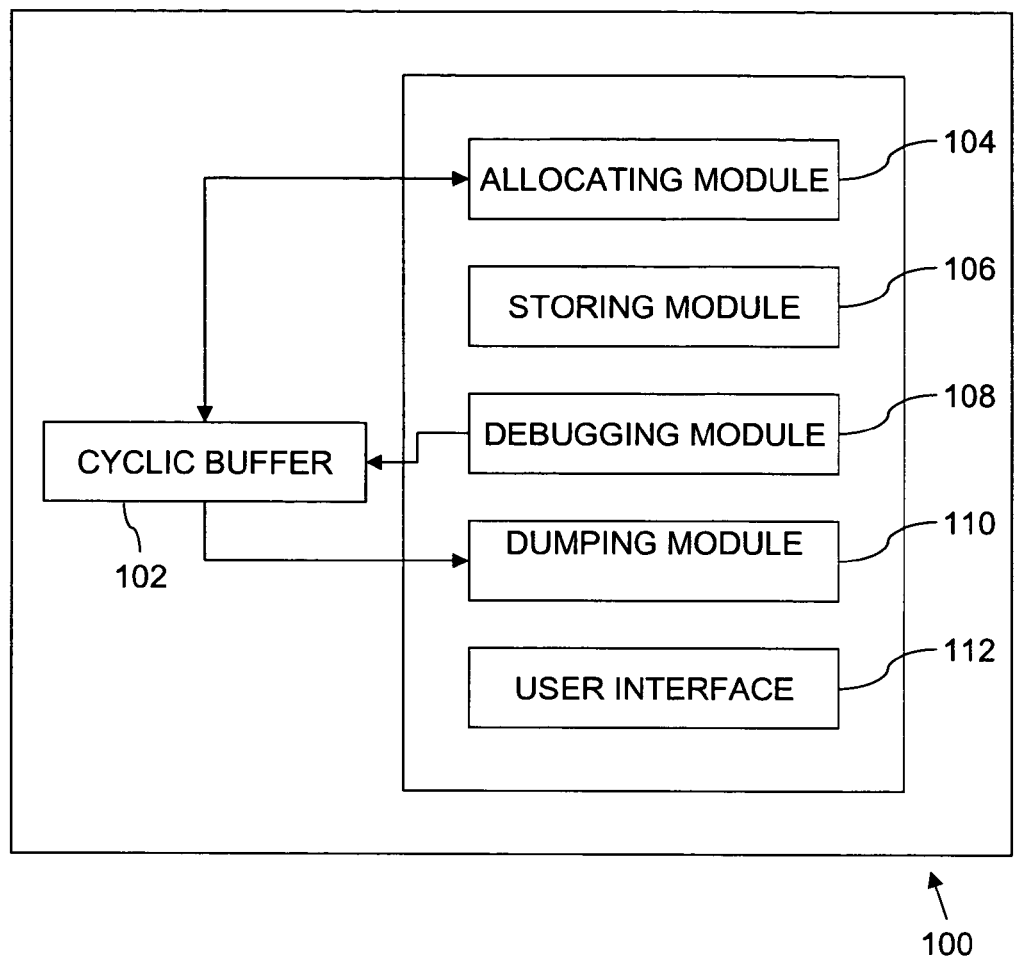
FIG. 1 illustrates a system for debugging an application in case of an exception, in accordance with an exemplary embodiment of the present invention.

FIG. 1 depicts a system 100 for debugging an application in the case of an exception, in accordance with an exemplary embodiment of the invention. System 100 includes a cyclic buffer 102, an allocating module 104, a storing module 106, and a debugging module 108. In an embodiment of the invention, system 100 further includes a dumping module 110 and a user interface 112. In an embodiment of the invention, the system elements can be connected via a network such as a Local Area Network (LAN) or a Wide Area Network (WAN).

Cyclic buffer 102 can include a memory space wherein the log messages of low severity can be stored temporarily. In various embodiments of the invention, cyclic buffer 102 stores recent messages. As the log messages fill up the queue in cyclic buffer 102, the oldest entries are dropped. The size of cyclic buffer 102 can be predefined. In various embodiments of the invention, cyclic buffer 102 can be a part of random access memory (RAM), flash memory, optical memory, a hard disk, and the like. In an embodiment of the invention, cyclic buffer 102 maintains the log messages in memory or a memory-mapped file.

Allocating module 104 allocates a certain cyclic buffer to the application, depending on the type of application. In an embodiment of the invention, cyclic buffer 102 may not be a part of system 100. In such a scenario, allocating module 104 communicates with cyclic buffer 102 to enable storage of messages in cyclic buffer 102.

Storing module 106 enables the storage of the log messages in cyclic buffer 102.

Debugging module 108 uses the stored log messages to debug the application in case of an exception. In an embodiment of the invention, debugging is based on time-stamp synchronization. In another embodiment of the invention, user interface 112 can display an error message to the user in the case of an exception.

In an embodiment of the invention dumping module 110 dumps the log messages stored in cyclic buffer 102 in a file in the case of an exception. In an embodiment of the invention, the dumping can be carried out by using an application program interface (API). In another embodiment of the invention, the dumping can also be initiated by the user through a graphic user interface (GUI). The log messages stored in the file can be used for debugging the application.

In an embodiment of the invention, the user can obtain the log messages by running a command or setting a flag even if there is no error. This enables the user to obtain the last transaction details for systems that have hung or crashed.

In an embodiment of the invention, in case of an application crash the log messages are dumped based on application communication failure if deployed in separate process or as a part of the kernel.

In an embodiment of the invention, the application can be configured at a particular logging level. The logging level controls the logging output. In an embodiment of the invention, system 100 further includes an identifying module that identifies a logging level at which the application is configured. In an embodiment of the invention, storing module 106 enables the storage of the log messages in cyclic buffer 102 if the logging level is more than a passed level. In an embodiment of the invention, a software developer defines the passed level.

Figure 2:
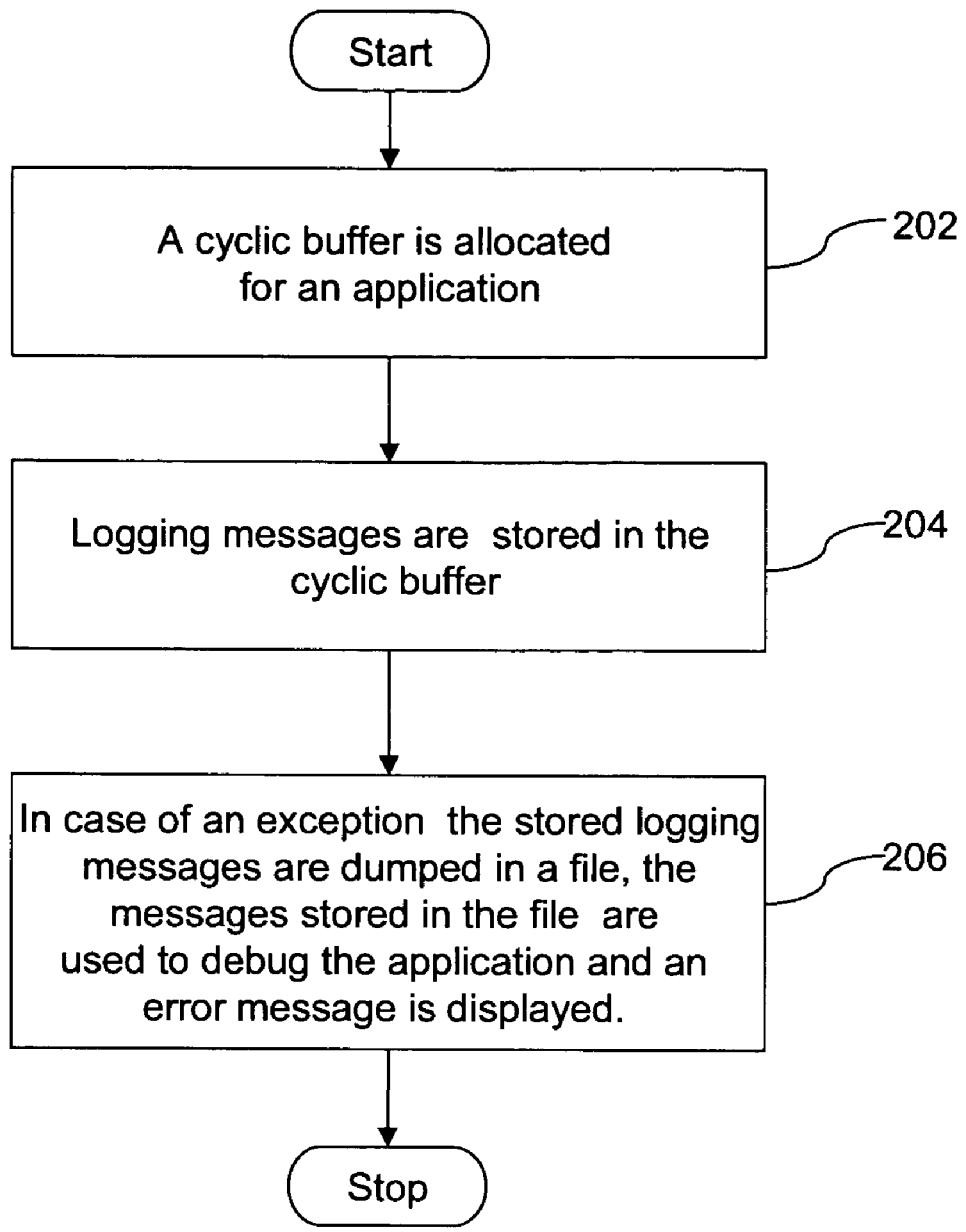
FIG. 2 is a flow chart depicting the requisite steps in a method for debugging an application in the case of an exception, in accordance with an exemplary embodiment of the present invention.

FIG. 2 is a flowchart illustrating a method of debugging an application in the case of an exception, wherein the application is configured at a logging level.

At step 202, a cyclic buffer is allocated. The size of the allocated cyclic buffer depends upon the type of application. At step 204, log messages are stored in the allocated cyclic buffer. If the exception occurs, then at step 206, the stored log messages are used to debug the application.

In an embodiment of the invention, the application is configured at a particular logging level. If the logging level is higher than a passed level the log messages are stored in the cyclic buffer else are discarded.

In one embodiment of the invention, the stored messages are first dumped in a file. The contents of the file can then be used to perform the debugging operation. In case there are dependencies associated with the application, then cyclic buffers of all the dependent applications can also be dumped in the file. In another embodiment of the invention, error messages are also displayed whenever an exception is encountered.

In an embodiment of the invention, logging and debugging can be performed by using, but not limited to, the time-stamp synchronization technique. This involves enabling time-stamping for log and/or debug messages.

The various embodiments of the invention enable storage of the log messages in a buffer irrespective of the logging level at which the application is configured. Therefore, context of failure can be obtained if an exception occurs.

The various embodiments of the invention ensure that the complete context of the exception, i.e., sufficient sequence of steps leading to the exception is available in the form of stored log messages. This is achieved in the various embodiments of the invention, by the use of high-speed, low-impact cyclic buffers to store log messages of low severity. Consequently, it is not necessary to recreate or rerun the scenario. The contents of the file can then be used to debug the applications. The embodiments of the invention ensure a drastic improvement in the turnaround time, to identify a user's problems.

Although the invention has been discussed with respect to specific embodiments thereof, these embodiments are merely illustrative, and not restrictive, of the invention. For example, a 'method for debugging an application' can include any type of analysis, manual or automatic, to anticipate the needs of debugging.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method, comprising:
    allocating a cyclic buffer to an application based on a type of the application;
    storing log messages in the allocated cyclic buffer, each of the log messages comprising a sequence of steps that occurred in a context of the application;
    dumping the stored log messages to a file when an exception occurs, the dumping being initiated via a user interface; and
    debugging the application using the dumped log messages.

2. The method of claim 1, further comprising displaying an error message on the user interface when the exception occurs.

3. The method of claim 1, wherein the user interface comprises an application program interface (API).

4. The method of claim 1, further comprising identifying a logging level at which the application is configured.

5. The method of claim 4, wherein the storing of the log messages in the allocated cyclic buffer is done only if the logging level is higher than a passed level.

6. The method of claim 5, wherein the log messages are discarded if the logging level is lower than the passed level.

7. An apparatus, comprising:
    one or more computer processors; and
    logic encoded in one or more storage media devices for execution by the one or more computer processors, and when executed operable to:
    allocate a cyclic buffer to an application based on a type of the application;
    store log messages in the allocated cyclic buffer, each of the log messages comprising a sequence of steps that occurred in a context of the application;
    dump the stored log messages to a file when an exception occurs, the dump being initiated via a user interface; and
    provide the dumped log messages for debugging the application.

8. The apparatus of claim 7, wherein the logic when executed is further operable to display an error message on the user interface when the exception occurs.

9. The apparatus of claim 7, wherein the user interface comprises an application program interface (API).

10. A system, comprising:
    a cyclic buffer configured for allocation to an application based on a type of the application;

a storing module for storing log messages in the cyclic buffer, each of the log messages comprising a sequence of steps that occurred in a context of the application;

a dumping module configured for dumping the stored log messages to a file when an exception occurs, the dumping being initiated via a user interface; and a debugging module for using the dumped log messages to debug the application, the debugging being performed if an exception occurs.

11. The system of claim 10, wherein the user interface is configured for displaying an error message when the exception occurs.

12. The system of claim 10, wherein the user interface comprises an application program interface (API).

13. The system of claim 10, further comprising an identifying module for identifying a logging level at which the application is configured.

14. A computer-readable storage medium storing instructions for debugging an application executable by a computer processor, the storage medium comprising:

one or more instructions for allocating a cyclic buffer to an application based on a type of the application;

one or more instructions for storing log messages in the allocated cyclic buffer, each of the log messages comprising a sequence of steps that occurred in a context of the application;

one or more instructions for dumping the stored log messages to a file when an exception occurs, the dumping being initiated via a user interface; and one or more instructions for providing the dumped log messages for debugging the application.

15. The method of claim 1, wherein the user interface comprises a graphical user interface (GUI).

16. The apparatus of claim 7, wherein the logic when executed is further operable to identify a logging level at which the application is configured.

17. The apparatus of claim 16, wherein the storing of the log messages in the allocated cyclic buffer is done only if the logging level is higher than a passed level.

18. The computer-readable storage medium of claim 14, further comprising one or more instructions for identifying a logging level at which the application is configured.

19. The computer-readable storage medium of claim 18, wherein the storing of the log messages in the allocated cyclic buffer is done only if the logging level is higher than a passed level.

20. The computer-readable storage medium of claim 19, wherein the log messages are discarded if the logging level is lower than the passed level.

* * * * *